United States Patent
Yeh

(10) Patent No.: US 9,619,380 B2
(45) Date of Patent: Apr. 11, 2017

(54) DATA WRITING METHOD, MEMORY CONTROL CIRCUIT UNIT AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 14/038,780

(22) Filed: Sep. 27, 2013

(65) Prior Publication Data

US 2015/0058531 A1 Feb. 26, 2015

(30) Foreign Application Priority Data

Aug. 23, 2013 (TW) .............................. 102130249 A

(51) Int. Cl.
*G06F 12/02* (2006.01)

(52) U.S. Cl.
CPC .. *G06F 12/0246* (2013.01); *G06F 2212/7203* (2013.01)

(58) Field of Classification Search
CPC ..................... G06F 12/0246; G06F 2212/7203
See application file for complete search history.

(56) References Cited

U.S. PATENT DOCUMENTS

| | | | | |
|---|---|---|---|---|
| 5,515,333 A | * | 5/1996 | Fujita et al. ................... | 365/229 |
| 2007/0283086 A1 | * | 12/2007 | Bates ............................. | 711/113 |
| 2008/0301359 A1 | * | 12/2008 | Smith .................... | G06F 3/0616 711/103 |
| 2009/0006725 A1 | * | 1/2009 | Ito et al. ........................ | 711/103 |
| 2010/0106893 A1 | * | 4/2010 | Fasoli et al. .................. | 711/103 |
| 2014/0019707 A1 | * | 1/2014 | Benhase ............... | G06F 12/023 711/171 |

* cited by examiner

*Primary Examiner* — Eric Oberly
(74) *Attorney, Agent, or Firm* — Jianq Chyun IP Office

(57) ABSTRACT

A data writing method for a memory storage apparatus having a first buffer memory, a second buffer memory and a rewritable non-volatile memory module is provided, and the transmission bandwidth of the first buffer memory is larger than the transmission bandwidth of the second buffer memory. The method includes: receiving a write command and first data thereof; determining whether the first data belongs to the successive big data; if the first data belongs to the successive big data, temporarily storing the first data into a first data buffer area of the first buffer memory, writing the first write data from the first data buffer area to the rewritable non-volatile memory module; and if the first data does not belongs to the successive big data, temporarily storing the first data into a second data buffer area of the second buffer memory.

18 Claims, 9 Drawing Sheets

DATA WRITING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 102130249, filed on Aug. 23, 2013. The entirety of the above-mentioned patent application is hereby incorporated by reference herein and made a part of this specification.

BACKGROUND

Technology Field

The present invention relates to a data writing method for a rewritable non-volatile memory module, a memory control circuit unit and a memory storage apparatus using the method.

Description of Related Art

Along with the widespread of digital cameras, cell phones, and MP3 in recently years, the consumers' demand for storage media has increased drastically. Since a rewritable non-volatile memory has several characteristics such as non-volatility of data, low power consumption, small size, non-mechanical structure, and fast reading and writing speed, the rewritable non-volatile memory is the most suitable memory applied in a portable electronic product, e.g., a laptop. A solid state drive is a memory storage apparatus adopting a flash memory as a storage medium. Therefore, the flash memory industry has become a very popular part of the electronic industry in recent years.

When the data is written into the rewritable non-volatile memory, a program fail may be occurred in the rewritable non-volatile memory, and the data writing is unsuccessful. Hence, at least one buffer memory would be disposed within a memory storage apparatus in general. The buffer memory is adopted for temporarily storing the data desired to be written to the memory storage apparatus. In other words, data to be written to the memory storage apparatus is stored in the buffer memory first, and then the data is written to the rewritable non-volatile memory from the buffer memory. Therefore, for writing data, the writing and reading operations on the buffer memory are both needed. As a result, when the transmission bandwidth of the buffer memory is not large enough, the bandwidth allocated for the data writing is relatively less.

Moreover, when the data is temporarily stored in the buffer memory, a control circuit of the memory storage apparatus sends a signal, which indicates that the command is accomplished, to a host in order to receive the next command and data. When the data is written to the rewritable non-volatile memory, a program fail may be occurred, and the data writing is unsuccessful. Accordingly, the control circuit of the memory storage apparatus has to write the data stored in the buffer memory into the rewritable non-volatile memory again (This is also called "a rewrite operation") where the data writing was failed. As a result, the buffer memory disposed in the memory storage apparatus has to be large enough in capacity to temporarily store the data so as to perform the rewrite operation.

In light of the foregoing descriptions, in order to increase the writing speed, a buffer memory with large bandwidth is required. However, for the requirement of rewriting, a large storage capacity buffer memory is also needed. Regarded to a buffer memory with large bandwidth, the cost of each memory unit is relatively high. Therefore, how to lower the production cost but still keep a buffer memory with appropriate capacity and bandwidth is the most concerned topic for the persons skilled in this art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a memory storage apparatus, a memory control circuit unit, and a data writing method for effectively using the bandwidth and capacity of a buffer memory disposed in the memory storage apparatus and improving the speed of writing data.

According to an exemplary embodiment of the present invention, a memory storage apparatus including a connecting interface unit, a rewritable non-volatile memory module, a memory control circuit unit, and a second buffer memory is provided. The connecting interface unit is configured to couple to a host system. The memory control circuit unit is coupled to the connecting interface unit and the rewritable non-volatile memory module, wherein the memory control circuit unit has a first buffer memory and the first buffer memory includes a first data buffer area. The second buffer memory is coupled to the first buffer memory, wherein the second buffer memory includes a second data buffer area and the transmission bandwidth of the second buffer memory is smaller than the transmission bandwidth of the first buffer memory. Herein, the memory control circuit unit is configured to receive a write command and a start logical address and first data corresponding to the write command, and determine whether the first data is a successive big data. If the first data is the successive big data, the memory control circuit unit temporarily stores the first data into the first data buffer area and writes the first data from the first data buffer area into the rewritable non-volatile memory module. If the first data is not the successive big data, the memory control circuit unit temporarily stores the first data into the second data buffer area.

According to an exemplary embodiment of the present invention, a memory control circuit unit including a host interface, a memory interface, a memory management circuit, a first buffer memory and a second buffer memory is provided. The host interface is coupled to a host system. The memory interface is coupled to the rewritable non-volatile memory module. The memory management circuit is coupled to the memory interface and the host interface. The first buffer memory is coupled to the memory management circuit and includes a first data buffer area. The second buffer memory is coupled to the first buffer memory and the memory management circuit, wherein the second buffer memory includes a second data buffer area and the transmission bandwidth of the second buffer memory is smaller than the transmission bandwidth of the first buffer memory. The memory management circuit is configured to receive a write command and a start logical address and first data corresponding to the write command. The memory management circuit is further configured to determine whether the first data is a successive big data. If the first data is the successive big data, the memory management circuit temporarily stores the first data into the first data buffer area and writes the first data from the first data buffer area into the rewritable non-volatile memory module. If the first data is not the successive big data, the memory management circuit temporarily stores the first data into the second data buffer area.

According to an exemplary embodiment of the present invention, a data writing method for a memory storage apparatus is provided, wherein the memory storage apparatus includes a first buffer memory, a second buffer memory and a rewritable non-volatile memory module, the transmission bandwidth of the first buffer memory is larger than the transmission bandwidth of the second buffer memory. The data writing method includes receiving a write command and a start logical address and first data corresponding to the write command, and determining whether the first data is a successive big data. The data writing method also includes: if the first data is the successive big data, temporarily storing the first data into the first data buffer area and writing the first data from the first data buffer area into the rewritable non-volatile memory module; and if the first data is not the successive big data, temporarily storing the first data into the second data buffer area.

In summary, the memory storage apparatus, the memory control circuit unit, and the data writing method described in the exemplary embodiments are capable of applying different buffer mechanisms to write data based on different type of the data, thereby effectively using the bandwidth and capacity of a buffer memory disposed in the memory storage apparatus and improving the speed of writing data.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the present invention more comprehensible, embodiments accompanying figures are described in detail below.

DESCRIPTION OF EMBODIMENTS

Figure 1:
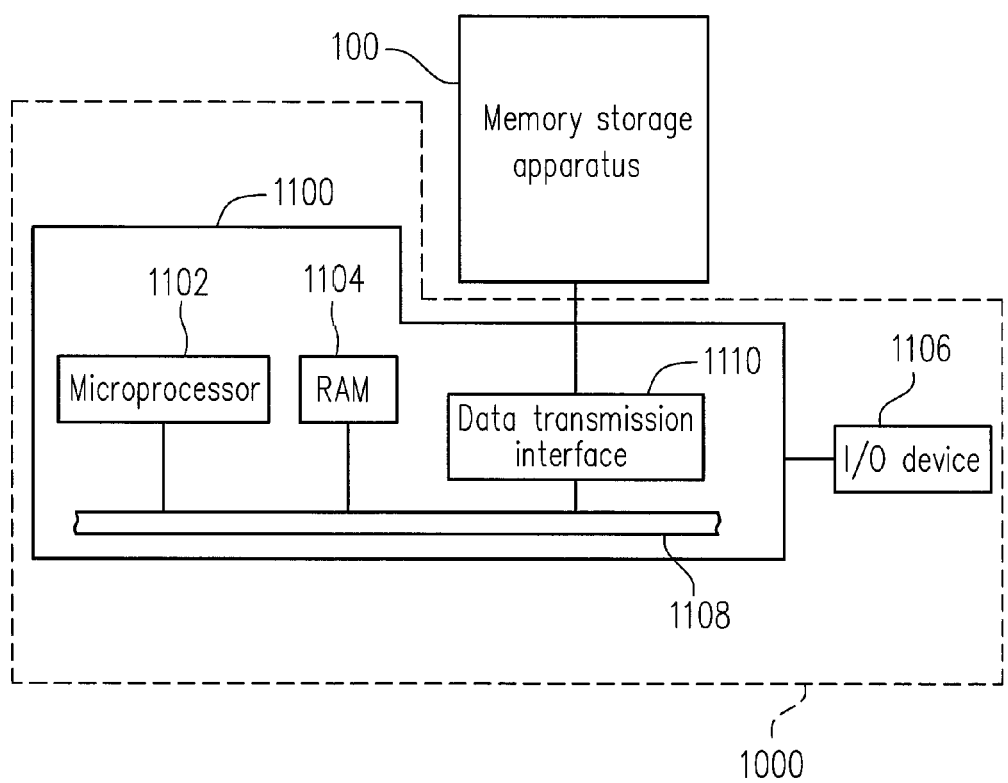
FIG. 1 illustrates a host system and a memory storage apparatus according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A memory storage apparatus (i.e., a memory storage system), typically, includes a rewritable non-volatile memory module and a controller (i.e., a control circuit). The memory storage apparatus is usually used together with a host system, such that the host system can write data into or read data from the memory storage apparatus.

FIG. 1 illustrates a host system and a memory storage apparatus according to an exemplary embodiment of the present invention.

Figure 2:
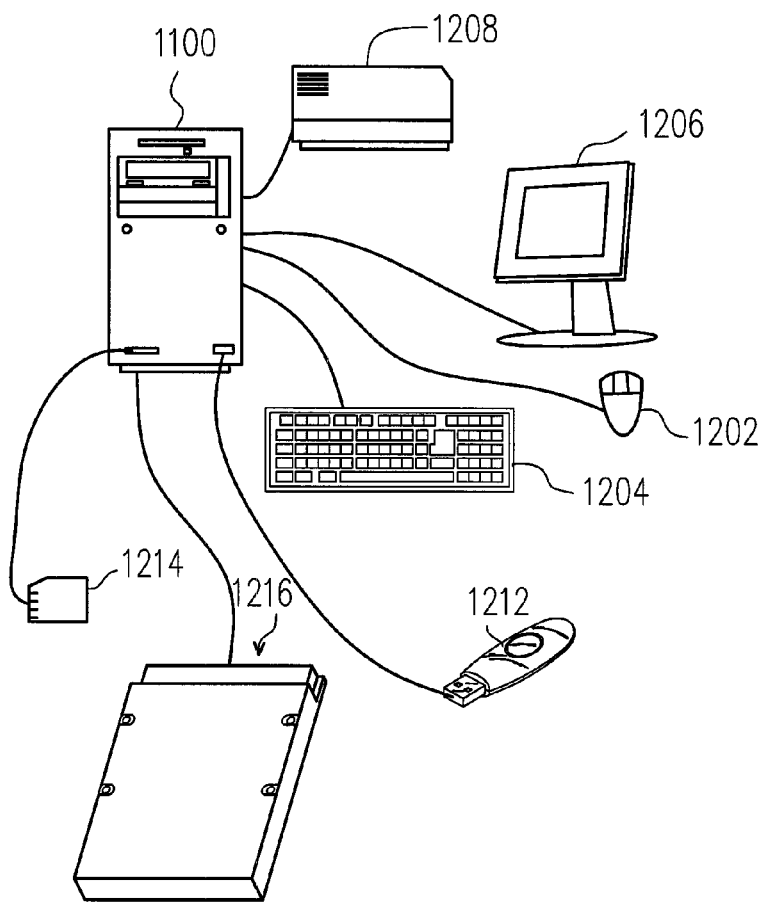
FIG. 2 illustrates a computer, an input/output (I/O) device, and a memory storage apparatus according to an exemplary embodiment of the present invention.

Referring to FIG. 1A, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2. It should be understood that, the devices depicted in FIG. 2 should not be construed as limitations to the present disclosure, and the I/O device 1106 may include other devices as well.

In the present exemplary embodiment, the memory storage apparatus 100 is coupled to other elements of the host system 1000 through the data transmission interface 1110. By using the microprocessor 1102, the RAM 1104, and the I/O device 1106, the data can be written into or read from the memory storage apparatus 100. The memory storage apparatus 100 is, for example, a flash drive 1212, a memory card 1214, or a solid state drive (SSD) 1216 which are rewritable non-volatile storage device as shown in FIG. 2.

Figure 3:
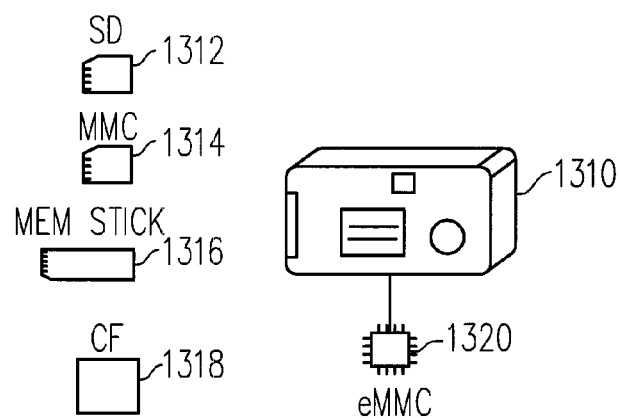
FIG. 3 illustrates a host system and a memory storage apparatus according to an exemplary embodiment of the invention.

Generally speaking, the host system 1000 may be any system which can substantially cooperate with the memory storage apparatus 100 for storing data. Even though the host system 1000 is described as a computer system in the present exemplary embodiment, the host system 1000 in another exemplary embodiment may be a digital camera, a video camera, a communication device, an audio player, a video player, and so forth. For example, if the host system is a digital camera (video camera) 1310, the rewritable non-volatile memory storage device is then a Secure digital (SD) card 1312, a Multi Media Card (MMC) 1314, a memory stick 1316, a compact flash (CF) card 1318 or an embedded storage device 1320 (as shown in FIG. 3) applied in the host system. The embedded storage device 1320 includes an Embedded MMC (eMMC). It should be noted that the eMMC is directly coupled to a substrate of the host system.

Figure 4:
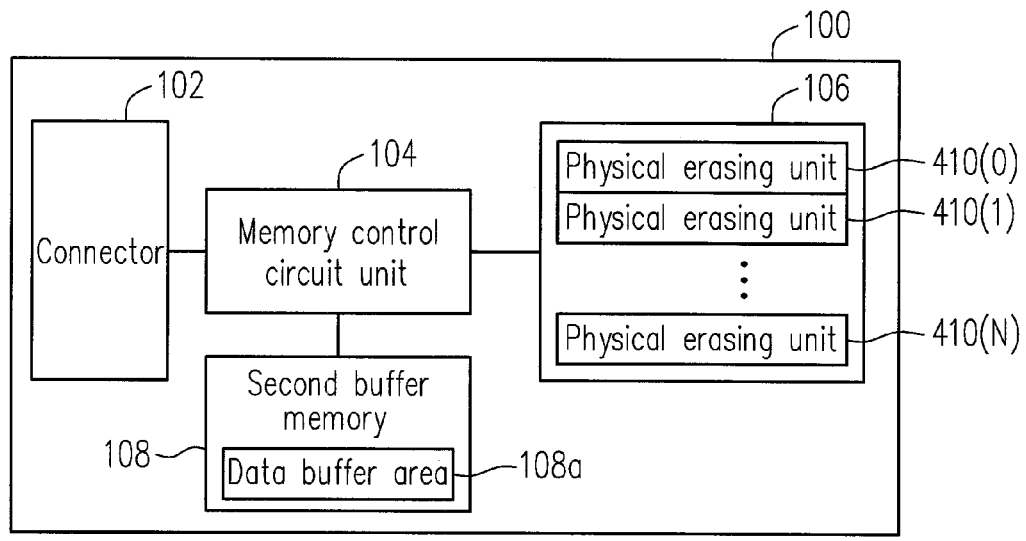
FIG. 4 is a schematic block diagram illustrating the memory storage apparatus depicted in FIG. 1.

FIG. 4 is a schematic block diagram illustrating the memory storage apparatus depicted in FIG. 1.

Referring to FIG. 4, the memory storage apparatus 100 includes a connector 102, a memory controller 104, a rewritable non-volatile memory module 106, and a second buffer memory 108.

In the present exemplary embodiment, the connecting interface unit 102 complies with the serial advanced technology attachment (SATA) standard. However, it should be understood that the invention is not limited thereto, and the connector 102 may also comply with the parallel advanced technology attachment (PATA) standard, the Institute of Electrical and Electronic Engineers (IEEE) 1394 standard, the peripheral component interconnect (PCI) express standard, the universal serial bus (USB) standard, the secure digital (SD) standard, the ultra high speed-I (UHS-I) interface standard, the ultra high speed-II (UHS-II) interface standard, the memory stick (MS) interface standard, the multi media card (MMC) interface standard, the eMMC interface standard, the universal flash storage (UFS) interface standard, the compact flash (CF) standard, the integrated device electronics (IDE) standard, or other suitable standards. In the present exemplary embodiment, the connecting interface unit and the memory control circuit unit may be packaged in one chip or laid outside a chip having the memory control circuit unit.

The memory control circuit unit 104 executes a plurality of logic gates or control instructions implemented in a hardware form or a firmware form and performs various data operations according to commands from the host system 1000, such as data writing, reading, and erasing in the rewritable non-volatile memory module 106.

The rewritable non-volatile memory module 106 is coupled to the memory control circuit unit 104 and is configured to store the data written by the host system 1000. The rewritable non-volatile memory module 106 includes a plurality of physical erasing units 410(0)-410(N). For instance, the physical erasing units 410(0)-410(N) can belong to the same memory die or different memory dies. Each physical erasing unit has a plurality of physical programming units, and the physical programming units of the same physical erasing unit may be written independently and erased simultaneously. For instance, each physical erasing unit is composed of 128 physical programming units. However, the invention is not limited thereto, and each of the physical erasing units may also be comprised of 64, 256, or any other number of physical programming units.

More specifically, the physical erasing unit is the smallest unit for erasing data. Namely, each of the physical erasing units contains the least number of memory cells that are erased all together. The physical programming unit is the smallest unit for programming data. That is, each of the physical programming units is the smallest unit for writing data. Each physical programming unit usually includes a data bit area and a redundant bit area. The data bit area includes a plurality of physical access addresses for storing user data, and the redundant bit area is configured for storing system data (e.g., control information and error correcting codes). In the present exemplary embodiment, each data bit area of the physical programming unit contains 4 physical access addresses, and the size of each physical access address is 512 bytes (512 B). However, in other exemplary embodiments, more or less number of the physical access addresses may be contained in the data bit area, and the number and the size of the physical access addresses are not limited in the present invention. For instance, in an exemplary embodiment, the physical erasing units are physical blocks, and the physical programming units are physical pages or physical sectors, which should however not be construed as limitations to the present invention.

In the present exemplary embodiment, the rewritable non-volatile memory module 106 is a multi-level cell (MLC) NAND flash memory module (i.e., a flash memory module capable of storing data of 2 bits in one memory cell). However, the invention is not limited thereto, and the rewritable non-volatile memory module 106 may also be a single-level cell (SLC) NAND flash memory module (i.e., a flash memory module capable of storing data of one bit in one memory cell), a trinary-level cell (TLC) NAND flash memory module (i.e., a flash memory module capable of storing data of 3 bits in one memory cell), any other flash memory module, or any other memory module with the same characteristics.

The second buffer memory 108 is disposed outside the memory control circuit unit and coupled to the memory control circuit unit 104. The second buffer memory 108 is configured for temporarily storing commands executed by memory controller 104 or data. For example, the second buffer memory includes a data buffer area 108a (hereinafter referred to as "the second data buffer area 108a") for receiving the writing data from the host system 1000 and preparing a backup. In the present exemplary embodiment, the second buffer memory 108 is a synchronous dynamic random access memory (SDRAM) and the transmission bandwidth of the second temporary memory 108 is 400M bits/sec. However, the present invention is not limited thereto. The second buffer memory 108 may be a dynamic random access memory (DRAM), a static random access memory (SRAM), a magnetoresistive random access memory (MRAM), a cache random access memory (Cache RAM), a synchronous dynamic random access memory (SDRAM), video random access memory (VRAM), NOR flash memory (NOR flash), embedded dynamic random access memory (eDRAM) or other memories.

Figure 5:
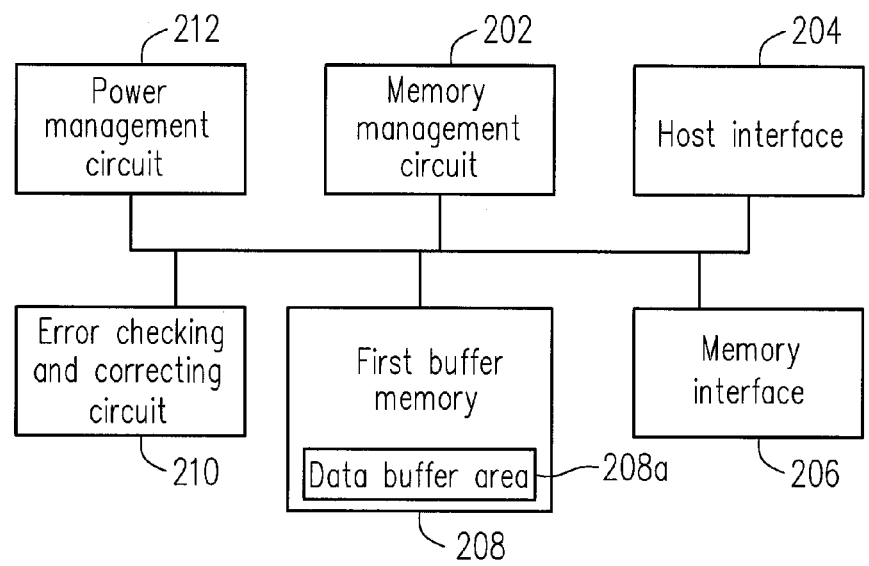
FIG. 5 is a schematic block diagram illustrating a memory control circuit unit according to an exemplary embodiment of the present invention.

FIG. 5 is a schematic block diagram illustrating a memory control circuit unit according to an exemplary embodiment of the present invention.

Referring to the FIG. 5, the memory control circuit unit 104 includes a memory management circuit 202, a host interface 204, a memory interface 206, a first buffer memory 208, an error checking and correcting circuit 210, and a power management circuit 212.

The memory management circuit 202 is configured to control the whole operation of the memory control circuit unit 104. Particularly, the memory management circuit 202 has a plurality of control instructions; when the memory storage apparatus 100 is operated, the control instructions are executed to perform a data writing operation, a data reading operation, a data erasing operation, and so on.

In the present exemplary embodiment, the control instructions of the memory management circuit 202 are implemented in a form of a firmware. For example, the memory management circuit 202 includes a microprocessor unit (not shown) and a read-only memory (ROM, not shown), wherein the control instructions are burnt in the read-only memory. When the memory storage apparatus 100 is operated, the control instructions are executed by the microprocessor unit to write, read, and erase data.

In another exemplary embodiment of the present invention, the control instructions of the memory management circuit 202 may also be stored in a specific block (for example, a system block in a memory module exclusively used for storing system data) of the rewritable non-volatile memory module 106 as a programming code. Additionally, the memory management circuit 202 may have a microprocessor unit (not shown), a read-only memory (not shown) and a random access memory (not shown). In particular, the ROM has boot codes, and when the memory control circuit unit 104 is enabled, the microprocessor unit first executes the boot codes to load the control instructions from the rewritable non-volatile memory module 106 into the RAM of the memory management circuit 202. The microprocessor unit then executes the control instructions to write, read, and erase data.

Furthermore, as in another exemplary embodiment, the control instructions in the memory management circuit 202 are implemented in a form of hardware. For example, the memory management circuit 202 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. The memory cell management circuit is configured to manage physical blocks of the rewritable non-volatile memory module 106. The memory writing circuit is configured to issue a write command to the rewritable non-volatile memory module 106 for writing data thereto. The memory reading circuit is configured to issue a read command to the rewritable non-volatile memory module 106 for reading data therefrom. The memory erasing circuit is configured to issue an erase command to the rewritable non-volatile memory module 106 for erasing data therefrom. The data processing circuit is configured to process data to be written to the rewritable non-volatile memory module 106 or data read from the rewritable non-volatile memory module 106.

The host interface 204 is coupled to the memory management circuit 202 and configured to receive and identify the commands and the data transmitted by the host system 1000. Namely, the commands and data transmitted by the host system 1000 are passed to the memory management circuit 202 through the host interface 204. In the present exemplary embodiment, the host interface 204 complies with the SATA standard. However, it should be understood that the present invention is not limited thereto, and the host interface 204 may comply with the PATA standard, the IEEE 1394 standard, the PCI express standard, the SD standard, the SATA standard, the UHS-I interface standard, the UHS-II interface standard, the MS standard, the MMC standard, the eMMC interface standard, the UFS interface standard, the CF standard, the IDE standard, or other suitable data transmission standards.

The memory interface 206 is coupled to the memory management circuit 202 for accessing the rewritable non-volatile memory module 106. In other words, data to be written into the rewritable non-volatile memory module 106 is converted to an acceptable format for the rewritable non-volatile memory module 106 by the memory interface 206.

The first buffer memory 208 is coupled to the memory management circuit 202 and configured to temporarily store commands executed by memory controller 202 or data. To be specific, the first buffer memory includes a data buffer area 208a (hereinafter referred to as "the first data buffer area 208a") which is for temporarily storing the data written by the host system 1000. However, it should be understood that, except the first data buffer area 208a, the first buffer memory 208 still comprises other areas (not shown) for temporarily storing other data. For example, the memory management circuit 202 may store a mapping table of virtual addresses and physical addresses of the rewritable non-volatile memory module 106 in other areas of the first buffer memory 208. In the present exemplary embodiment, the transmission bandwidth of the first buffer memory 208 is larger than the transmission bandwidth of the second buffer memory 108. For example, the first temporary memory 208 is a static random access memory (SRAM). However, the first buffer memory 208 may be the MRAM, Cache RAM, SDRAM, VRAM, NOR Flash or eDRAM. Herein, the transmission bandwidth of the first temporary memory 208 is 800M bits/sec.

The power management circuit 210 is coupled to the memory management circuit 202 and configured to control the power of the memory storage apparatus 100.

The error checking and correcting circuit 212 is coupled to the memory management circuit 202 and configured to perform an error checking and correcting process to assure the accuracy of data. To be more specific, when the memory management circuit 202 receives a write command from the host system 1000, the error checking and correcting circuit 212 generates an error checking and correcting code (ECC code) corresponding to the data of the write command, and the memory management circuit 202 writes the data corresponding to the write command and the corresponding ECC code into the rewritable non-volatile memory module 106. Afterwards, when the memory management circuit 202 reads the data from the rewritable non-volatile memory module 106, the corresponding error checking and correcting code is also be read, and the error checking and correcting circuit 212 executes the error checking and correcting process to the read data according to the ECC code.

Figure 6:
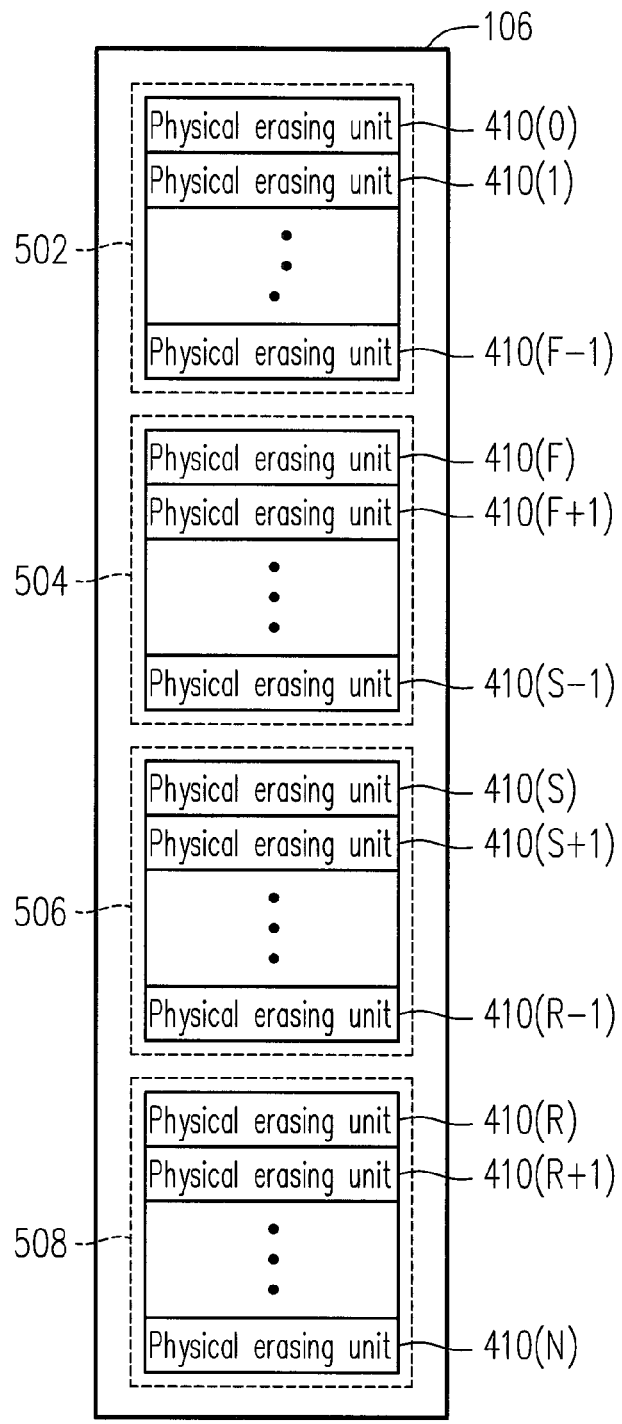
FIG. 6 and FIG. 7 are exemplary diagrams of managing physical blocks according to an exemplary embodiment of the present invention.
Figure 7:
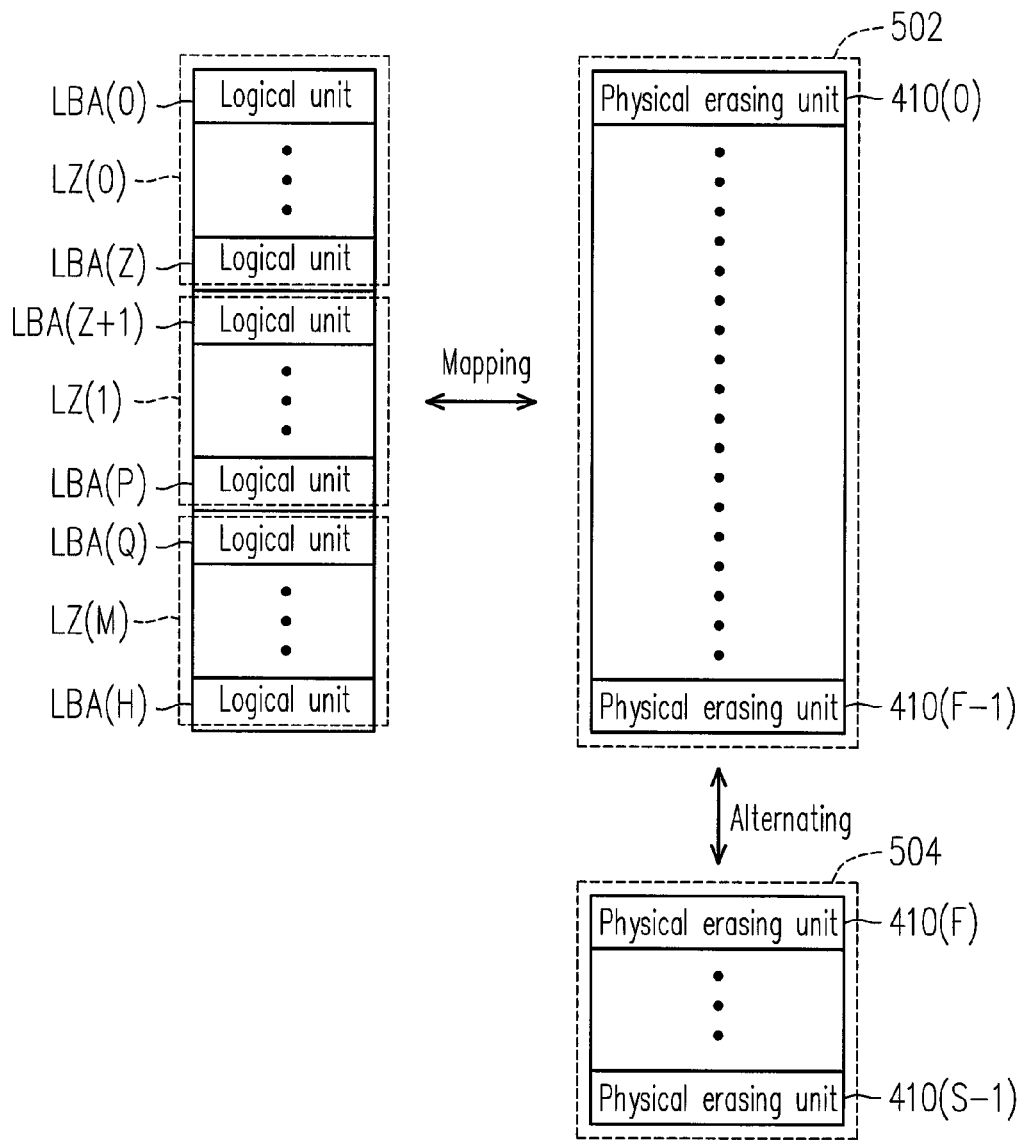

FIG. 6 and FIG. 7 are exemplary diagrams of managing physical erasing units according to an exemplary embodiment of the present invention.

Referring to FIG. 6, the memory control circuit unit 104 (or the memory management circuit 202) logically groups the physical erasing units 410(0)~410(N) into a data area 502, a spare area 504, a system area 506, and a replacement area 508.

The physical erasing units logically belonging to the data area 502 and the spare area 504 are used for storing data from the host system 1000. To be specific, the physical erasing units of the data area 502 are the physical erasing units which have been used for storing data, and the physical erasing units of the spare area 504 are the physical erasing units which are used for substituting the physical erasing units of the data area 502. Namely, when a write command and data to be written are received from the host system 1000, the memory management circuit 202 selects a physical erasing unit from the spare area 504 and writes the data into the selected physical erasing unit for substituting the physical erasing units of the data area 502.

The physical erasing units logically belonging to the system area 506 are used for recording system data. For instance, the system data includes the manufacturers and models of the rewritable non-volatile memory module, the number of physical erasing units in the rewritable non-volatile memory modules, the number of physical programming units in each physical erasing unit, and so on.

Physical erasing units logically belonging to the replacement area 508 are used in a bad physical erasing unit replacement procedure for replacing damaged physical erasing units. Particularly, if there are still normal physical erasing units in the replacement area 508 while a physical erasing unit in the data area 502 is damaged, the memory management circuit 202 selects a normal physical erasing unit from the replacement area 508 to replace the damaged physical erasing unit.

In particular, the numbers of physical erasing units in the data area 502, the spare area 504, the system area 506 and the replacement area 508 are various based on different memory module standards. Additionally, it has to be understood that the grouping relationships of grouping the physical erasing units into the data area 502, the spare area 504, the system area 506 and the replacement area 508 are dynamically changed during the operation of the memory storage apparatus 100. For example, when a physical erasing unit in the spare area 504 is damaged and replaced by a physical erasing unit in the replacement area 508, the physical erasing unit in the replacement area 508 is associated with the spare area 504.

Referring to FIG. 7, the memory control circuit unit 104(or the memory management circuit 202) configures a plurality of logical units LBA(0)~LBA(H) for mapping to the physical erasing units of the data area, wherein each logical units includes a plurality of logical pages for mapping to the physical programming units of the corresponding physical units. And, when the host system 1000 is about to write data into a logical unit or update data stored in the logical unit, the memory control circuit unit 104 (or the memory management circuit 202) selects a physical block from the spare area 504 and writes the data into the selected physical erasing unit for substituting the physical erasing units of the data area 502.

In order to identify which physical programming units are used for storing data of each logical unit, in the exemplary embodiment, the memory control circuit unit 104 (or the memory management circuit 202) recodes mappings between the logical pages and the physical programming units, wherein the size of one logical page is the same as that of one physical programming unit. Herein, the size of one physical programming units is also referred to one data accessing unit. And, when the host system 1000 is about to access data at a logical page, the memory control circuit unit 104 (or the memory management circuit 202) identifies a logical unit that the logical page belongs to, and accesses data at a physical programming unit mapping to the logical page.

Figure 8:
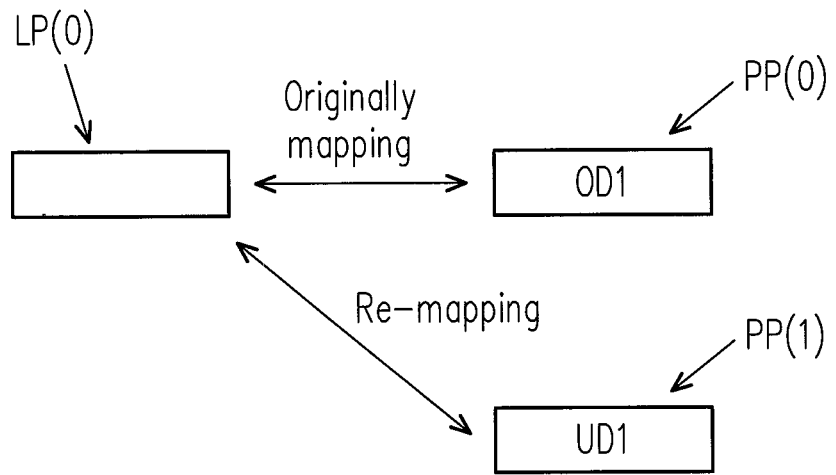
FIG. 8 is a diagram illustrating an example of updating data in one logical page according to an exemplary embodiment of the present invention.

FIG. 8 is a diagram illustrating an example of updating data in one logical page according to an exemplary embodiment of the present invention.

Referring to FIG. 8, if the host system 1000 gives a write command indicating writing data UD1 starting from a start address of the logical page LP(0) and the size of the data UD1 is the same as the size of one physical programming unit, the memory control circuit unit 104 (or the memory management circuit 202) identifies that the logical page LP(0) is mapping to the physical programming unit PP(0), selects an empty physical programming unit (e.g., the physical programming unit PP(1)) for substituting the physical programming unit PP(0), writes the data UD1 into the physical programming unit PP(1), and remaps the logical page LP(0) to the physical programming unit PP(1). Then, data OD1 stored in the physical programming unit PP(0) originally mapping to the logical page LP(0) is marked as "invalid data".

Figure 9:
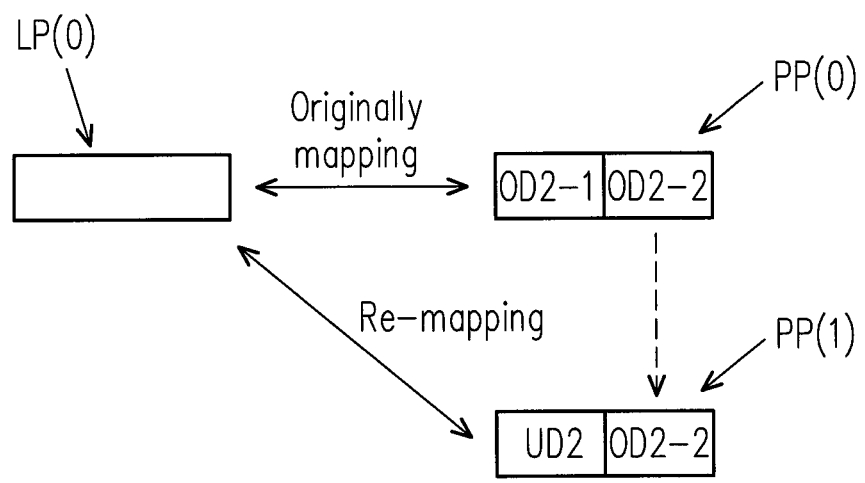
FIG. 9 is a diagram illustrating another example of updating data in one logical page according to another exemplary embodiment of the present invention.

FIG. 9 is a diagram illustrating another example of updating data in one logical page according to another exemplary embodiment of the present invention.

Referring to FIG. 9, if the host system 1000 gives a write command indicating writing data UD2 starting from a start address of the logical page LP(0) and the size of the data UD2 is an half of the size of one physical programming unit, the memory control circuit unit 104 (or the memory management circuit 202) identifies that the logical page LP(0) is mapping to the physical programming unit PP(0), selects an empty physical programming unit (e.g., the physical programming unit PP(1)) for substituting the physical programming unit PP(0), reads non-updated data (i.e., old valid data) OD2-2 from the physical programming unit PP(0) mapping the logical page LP(0), writes the data UD2 and the old valid data OD2-2 into the physical programming unit PP(1), and remaps the logical page LP(0) to the physical programming unit PP(1). Then, data OD2-1 and data OD2-2 stored in the physical programming unit PP(0) originally mapping to the logical page LP(0) are marked as "invalid data".

Because the memory control circuit unit 104 (or the memory management circuit 202) records the mappings between the logical pages and the physical programming units, when the host system 1000 gives a command indicating reading data from the logical page LP(0), the memory control circuit unit 104 (or the memory management circuit 202) can read the updated data from the physical programming unit PP(1) based on the recorded mappings.

In the present exemplary embodiment, the memory control circuit unit 104 (or the memory management circuit 202) stores a logical-physical address mapping table in the rewritable non-volatile memory module 106 to record the physical erasing unit mapped to each logical unit, and when accessing data, the memory control circuit unit 104 (or the memory management circuit 202) loads the logical-physical address mapping table into the first buffer memory 208 for maintaining.

It should be noted that the storage space of the first buffer memory 208 is limited and can not store a mapping table recording mappings for all of the logical units. In this exemplary embodiment, the memory control circuit unit 104 (or the memory management circuit 202) groups the logical units LBA(0)~LBA(H) into a plurality of logical zones LZ(0)~LZ(M) and configures logical-physical address mapping tables respectively for the logical zones. In particular, when the memory control circuit unit 104 (or the memory management circuit 202) is about to update a mapping for a logical unit, a logical-physical address mapping table for a logical zone that the logical unit belongs to is loaded into the first buffer memory 208 for updating.

In the present exemplary embodiment, when the host system 1000 gives a write command and write data corresponding to the write command to the memory storage apparatus 100, the memory control circuit unit 104 (or the memory management circuit 202) temporarily stores the write data into the buffer memory first. In particular, because the first buffer memory 208 and the second buffer memory 108, which have different capacities, are disposed in the memory storage apparatus 100, in the present exemplary embodiment, the memory control circuit unit 104 (or the memory management circuit 202) may apply a general buffer writing mechanism or a accelerating buffer writing mechanism to write data based on the type of the data.

Figure 10:
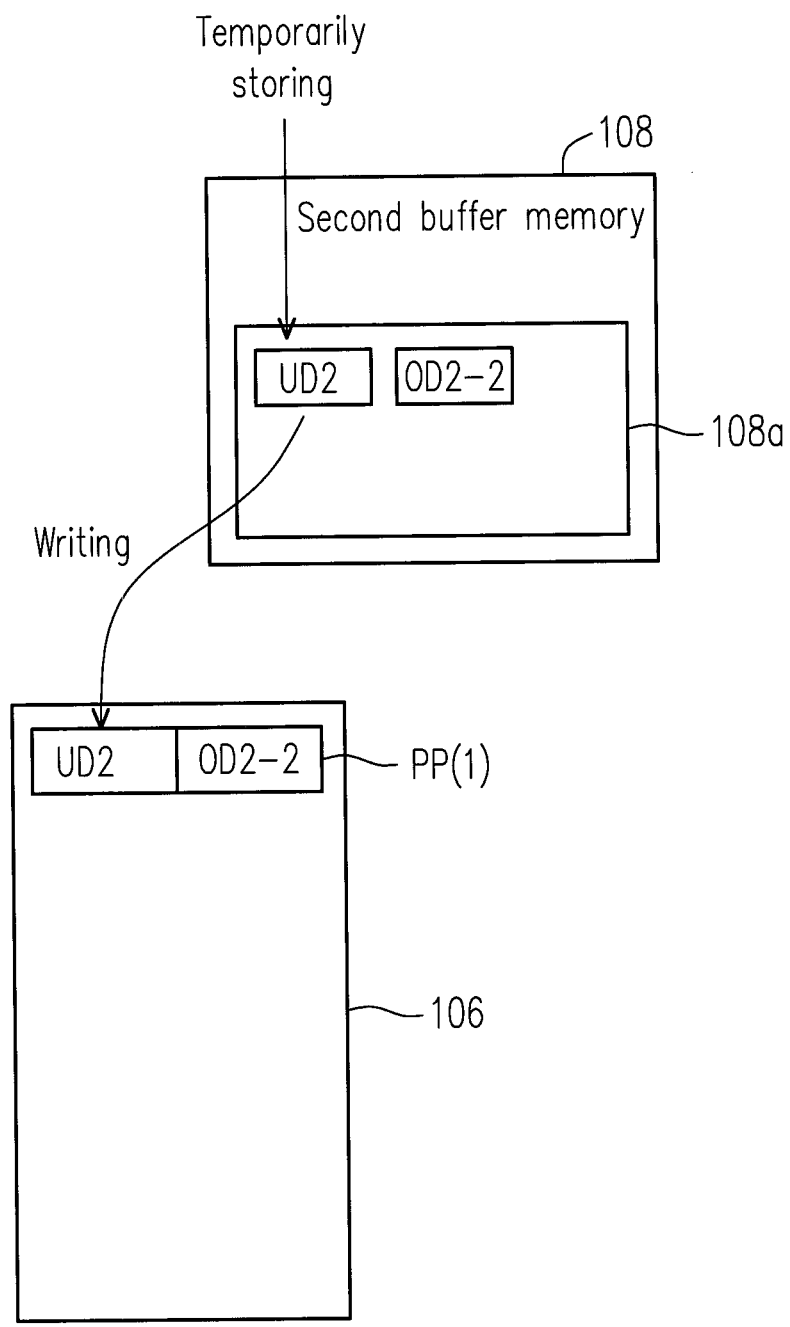
FIG. 10 is a diagram illustrating an example of writing data with a general buffer writing mechanism according to an exemplary embodiment of the present invention.

FIG. 10 is a diagram illustrating an example of writing data with a general buffer writing mechanism according to an exemplary embodiment of the present invention.

Referring to FIG. 10, when a write command and data UD2 corresponding to the write command are received from the host system 1000, the data UD2 is temporarily stored into the second data buffer area 108a of the second buffer memory 108. For example, the memory control circuit unit 104 (or the memory management circuit 202) may transmits the data UD2 to the second buffer memory 108 through a bus connected to the second buffer memory 108 or via the first buffer memory 208 through a bus connected to the first buffer memory 208. Then, the memory control circuit unit 104 (or the memory management circuit 202) transmits the data UD2 from the second data buffer area 108a of the second buffer memory 108 to the physical programming units of the rewritable non-volatile memory module 106. For example, the data OD2-2 is read first to the second buffer memory 108, and then the data UD2 and the data OD2-2 are programmed into one physical programming unit PP(1).

That is, in the general buffer writing mechanism, the second buffer memory 108 is used both for receiving write data and transmitting the write data into the buffer area of the rewritable non-volatile memory module 106. In particular, in the general buffer writing mechanism, the write operation and the read operation share the bandwidth of the second buffer memory 108, and therefore the speed of writing data with the general buffer writing mechanism is slower.

Figure 11:
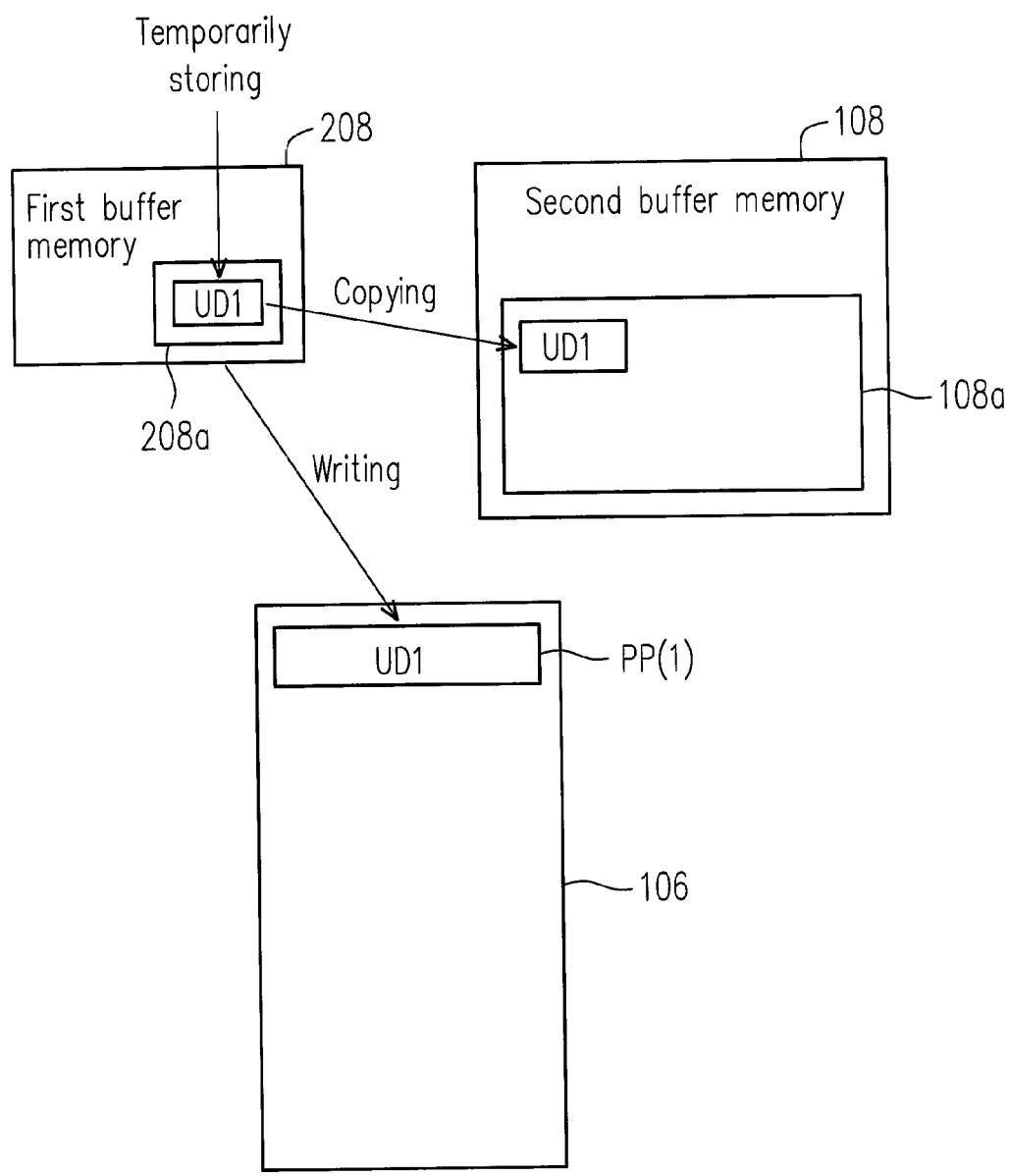
FIG. 11 is a diagram illustrating an example of writing data with an accelerating buffer writing mechanism according to an exemplary embodiment of the present invention.

FIG. 11 is a diagram illustrating an example of writing data with an accelerating buffer writing mechanism according to an exemplary embodiment of the present invention.

Referring to FIG. 11, in order to improve the data writing speed of the memory storage apparatus 100, the first buffer memory 208 with the larger transmission bandwidth is configured as a region for temporarily storing write data and the second buffer memory 108 with smaller transmission bandwidth is configured as a backup region for storing the write data.

For example, when the memory storage apparatus 100 receives a write command and data UD1 corresponding to the write command from the host system 1000, the memory control circuit unit 104 (or the memory management circuit 202) temporarily store the data UD1 into the first data buffer area 208a of the first buffer memory first. Because the transmission bandwidth of the first buffer memory 208 is larger, the demand of writing data by the host system 1000 can be satisfied. In other words, the writing speed of temporarily storing the data UD1 into the first data buffer area 208a by the memory management circuit 202 is not slower than the writing speed of transmitting the data UD1 to the memory management circuit 202 by the host system 1000. Therefore, it is possible to receive data from the host system 1000 in real time and temporarily store the data into the first buffer memory 208.

In the accelerating buffer writing mechanism, the transmission bandwidth of the first buffer memory 208 can be shared by a write operation or a read operation. For example, while data is written into the first buffer memory 208, another data may be read from the first buffer memory 208 and transmitted to the second buffer memory 108. For another example, while data is written into the first buffer memory 208, another data may be read from the first buffer memory 208 and transmitted to the second buffer memory 108.

Next, the memory control circuit unit 104 (or the memory management circuit 202) reads the data UD1 from the first data buffer area 208a, and writes the data UD1 into the rewritable non-volatile memory module 106 according to the write command.

On the other hand, the memory control circuit unit 104 (or the memory management circuit 202) reads the data UD1 from the first buffer area 208a and copies the data UD1 to the second data buffer area 108a of the second buffer memory 108. It should be noted that, in the accelerating buffer writing mechanism, the transmission bandwidth of the second buffer memory 108 can be fully used for transmitting the data UD1. In other words, for the data UD1, the memory control circuit unit 104 (or the memory management circuit 202) can only perform the write operation to the second buffer memory 108 without any read operation. In addition, the memory control circuit unit 104 (or the memory management circuit 202) can simultaneously write the data UD1 to the rewritable non-volatile memory module 106 and copy the data UD1 to the second buffer memory 108, too.

Accordingly, the data UD1 is stored in the second buffer memory 108, and the memory control circuit unit 104 (or the memory management circuit 202) may receive the following write command from the host system 1000 and temporarily store the following write data into the first buffer memory 208 according to the following write command from the host system 1000. Especially, since the data UD1 is already stored in the second buffer memory 108, the address for storing the data UD1 in the first buffer memory 208 may be used for temporarily storing another new write data without interfering the operation of the memory storage apparatus 100.

For example, the memory control circuit unit 104 (or the memory management circuit 202) may determine whether a program fail is occurred after writing the data UD1 into the rewritable non-volatile memory module 106. If the program fail is occurred, the memory control circuit unit 104 (or the memory management circuit 202) reads the data UD1 from the second buffer memory 108 and writes the data UD1 into the rewritable non-volatile memory module 106 again according to the write command. In other words, when the program fail is occurred and the data UD1 is failed to be written into the rewritable non-volatile memory module 106, even the data UD1 in the first buffer memory 208 has been updated with another new write data, the data UD1 still can be found in the second buffer memory 108 and be written into the rewritable non-volatile memory module 106 by the memory control circuit unit 104 (or the memory management circuit 202). As a result, the memory storage apparatus 100 uses the first buffer memory 208 with larger bandwidth to increase the speed of writing data, so as to make sure the data UD1 can be written in the rewritable non-volatile memory module 106 successfully. In the present exemplary embodiment, when the memory control circuit unit 104 (or the memory management circuit 202) reads the data UD1 from the second buffer memory 108, the transmission bandwidth of the second buffer memory 108 can be fully used for transmitting the data UD1. That is, in the accelerating buffer writing mechanism, the transmission bandwidth of the second buffer memory 108 is used to execute only a single operation, for example, a write operation or a read operation. For example, the transmission bandwidth of the second buffer memory 108 can be fully used for writing data into the second buffer memory 108. Or, the transmission bandwidth of the second buffer memory 108 can be fully used for reading data from the second buffer memory 108.

In the present exemplary embodiment, when receiving a write command and data corresponding to the write command, the memory control circuit unit 104 (or the memory management circuit 202) determines whether the data is successive big data. And, if the data is the successive big data, the memory control circuit unit 104 (or the memory management circuit 202) applies the accelerating buffer writing mechanism to write the data, and if the data is not the successive big data, the memory control circuit unit 104 (or the memory management circuit 202) applies the general buffer writing mechanism to write the data.

To be specific, the memory control circuit unit 104 (or the memory management circuit 202) determines whether an address (i.e., a start logical address) starting to write the write data indicated by the write command is a multiple of the data access unit and the size of the write data indicated by the write command is a multiple of the data access unit.

If the start logical address indicated by the write command is a multiple of the data access unit and the size of the write data is a multiple of the data access unit, it represents that the write data is used to update all of data in a logical page (as shown in FIG. 8). In this case, the memory control circuit unit 104 (or the memory management circuit 202) applies the accelerating buffer writing mechanism to write the write data. In details, all data stored in a physical programming unit is updated without reading old valid data, and therefore the larger transmission bandwidth of the first buffer memory can be effectively utilized to improve the speed of writing data by applying the accelerating buffer writing mechanism.

If the start logical address indicated by the write command is not a multiple of the data access unit or the size of the write data is not a multiple of the data access unit, it represents that at least one data in a logical page is not updated (as shown in FIG. 9). In this case, the memory control circuit unit 104 (or the memory management circuit 202) applies the general buffer writing mechanism to write the write data. In details, since only a portion of data stored in a physical programming unit is updated, the write data is first kept in the buffer memory and old valid data is read, and then the write data and the old valid data is programmed in a unit of a physical programming unit. Accordingly, the second buffer memory having the larger capacity can be effectively utilized to prevent the first buffer memory 208 from occupied fully, such that other command can be performed.

Figure 12:
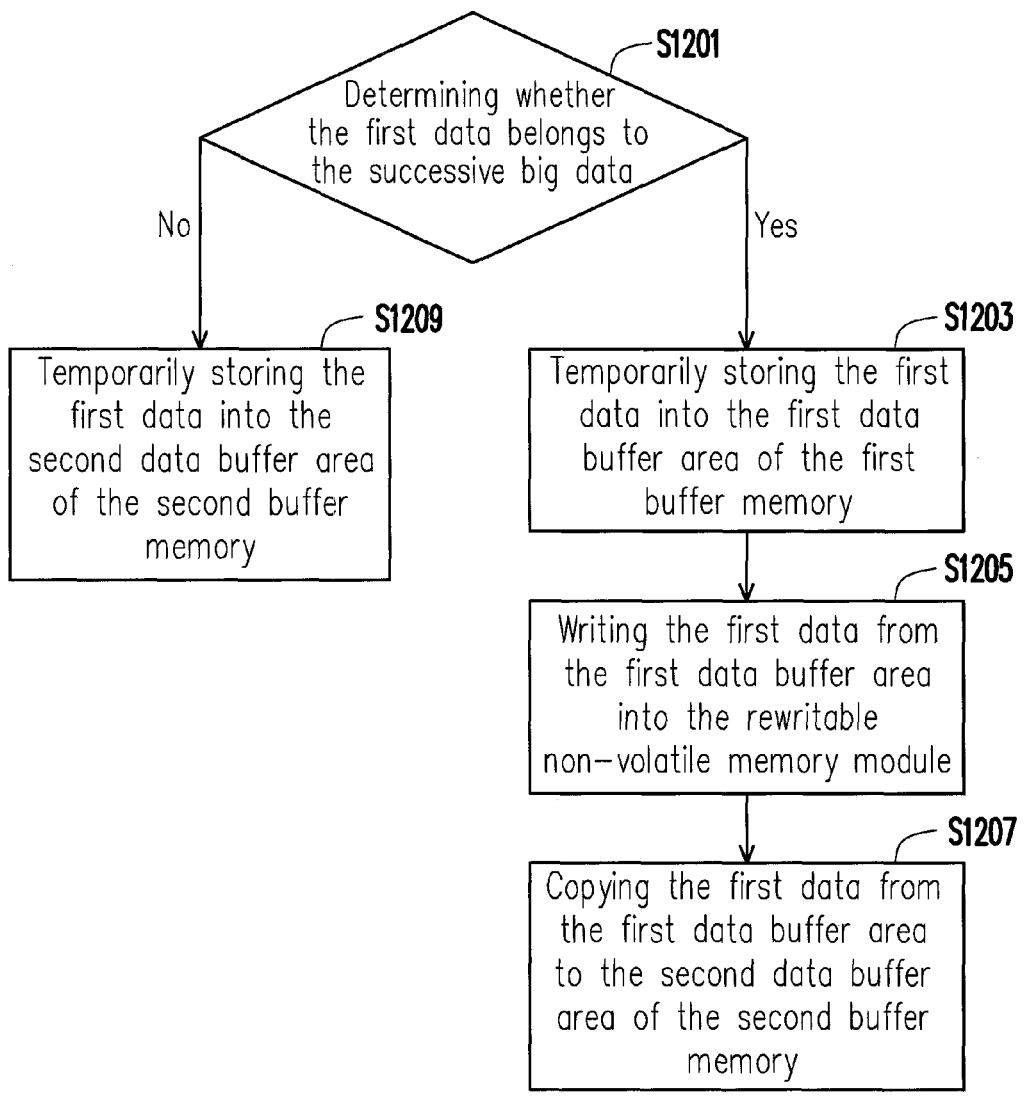
FIG. 12 is a flowchart illustrating a data writing method according to an exemplary embodiment of the present invention.

FIG. 12 is a flowchart illustrating a data writing method according to an exemplary embodiment of the present invention.

Referring to FIG. 12, when receiving a write command indicating a logical address and data (herein after referred to as "the first data"), in step S1201, the memory control circuit unit 104 (or the memory management circuit 202) determines whether the first data belongs to the successive big data. For example, as described above, the memory control circuit unit 104 (or the memory management circuit 202) determines whether the data belongs to the successive big data according to the start logical address indicated by the write command and the size of the data to be written.

If the first data belongs to the successive big data, in step S1203, the memory control circuit unit 104 (or the memory management circuit 202) temporarily stores the first data into the first data buffer area 208a of the first buffer memory 208.

Then, in step S1205, the memory control circuit unit 104 (or the memory management circuit 202) writes the first data from the first data buffer area 208a into the rewritable non-volatile memory module 106. And, in step S1207, the memory control circuit unit 104 (or the memory management circuit 202) copies the first data from the first data buffer area 208a to the second data buffer area 108a of the second buffer memory 108.

If the first data does not belong to the successive big data, in step S1209, the memory control circuit unit 104 (or the memory management circuit 202) temporarily stores the first data into the second data buffer area 108a of the second buffer memory 108. It should be mentioned that the memory control circuit unit 104 (or the memory management circuit 202) then may read old valid data (hereinafter referred to as "the second data") from a corresponding physical programming unit to the second data buffer area 108a of the second buffer memory 108 and write the first data and the second data into an empty physical programming unit (as shown in FIG. 9).

It should be mentioned that even though the second buffer memory 108 is disposed independently, however, the present invention is not limited thereto. In another exemplary embodiment, the second buffer memory 108 may be disposed in the memory control circuit unit 104.

In summary, the memory storage apparatus, the memory control circuit unit, and the data writing method described in the exemplary embodiments are capable of applying different buffer writing mechanisms to write data based on different type of the data, thereby effectively using the bandwidth and capacity of a buffer memory disposed in the memory storage apparatus and improving the speed of writing data. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory storage apparatus, comprising:
a connecting interface unit configured to couple to a host system;
a rewritable non-volatile memory module;
a memory control circuit unit coupled to the connecting interface unit and the rewritable non-volatile memory module, wherein the memory control circuit unit includes a first buffer memory and the first buffer memory includes a first data buffer area; and
a second buffer memory coupled to the first buffer memory, wherein the second buffer memory includes a second data buffer area and a transmission bandwidth of the second buffer memory is smaller than a transmission bandwidth of the first buffer memory,
wherein the memory control circuit unit is configured to receive a write command, a start logical address corresponding to the write command and first data corresponding to the write command,
wherein the memory control circuit unit is further configured to determine whether the first data is a successive big data,
if the first data is the successive big data, the memory control circuit unit temporarily stores the first data into the first data buffer area and writes the first data from the first data buffer area into the rewritable non-volatile memory module,
if the first data is not the successive big data, the memory control circuit unit temporarily stores the first data into the second data buffer area without storing the first data into the first data buffer area.

2. The memory storage apparatus according to claim 1, wherein in the operation of determining whether the first data is the successive big data, the memory control circuit unit determines whether the start logical address is a multiple of a data access unit and whether a size of the first data is a multiple of the data access unit, if the start logical address is the multiple of the data access unit and the size of the first data is the multiple of the data access unit, the memory control circuit unit identifies that the first data is the successive big data, if the start logical address is not the multiple of the data access unit or the size of the first data is not the multiple of the data access unit, the memory control circuit unit identifies that the first data is not the successive big data.

3. The memory storage apparatus according to claim 1, wherein if the first data is not the successive big data, the memory control circuit unit is further configured to read second data from a first physical programming unit of the rewritable non-volatile memory module to the second data buffer area and write the first data and the second data from the second data buffer area into a second physical programming unit of the rewritable non-volatile memory module.

4. The memory storage apparatus according to claim 1, wherein the memory control circuit unit is further configured to determine whether a program fail is occurred after writing the first data into the rewritable non-volatile memory module, if the program fail is occurred, the memory control circuit unit reads the first data from the second buffer memory and rewrites the first data into the rewritable non-volatile memory module according to the write command.

5. The memory storage apparatus according to claim 1, wherein the memory control circuit unit is further configured to receive a read command from the host system, wherein the memory control circuit unit is further configured to determine whether the second buffer memory stores third data belonging to a logical address indicated by the read command, wherein if the second buffer memory stores the third data belonging to the logical address indicated by the read command, the memory control circuit unit reads the third data from the second buffer memory and transmits the third data to the host system in response to the read command.

6. The memory storage apparatus according to claim 1, wherein the second buffer memory is disposed within the memory control circuit unit or outside the memory control circuit unit.

7. The memory storage apparatus according to claim 1, wherein the first buffer memory is a static random access memory, the second buffer memory is a synchronous dynamic random access memory, and a capacity of the second buffer memory is larger than a capacity of the first buffer memory.

8. A memory control circuit unit, comprising:
a host interface coupled to a host system;
a memory interface coupled to a rewritable non-volatile memory module;
a memory management circuit coupled to the memory interface and the host interface;
a first buffer memory coupled to the memory management circuit and includes a first data buffer area; and
a second buffer memory coupled to the first buffer memory and the memory management circuit, wherein the second buffer memory includes a second data buffer area and a transmission bandwidth of the second buffer memory is smaller than a transmission bandwidth of the first buffer memory, wherein the memory management circuit is configured to receive a write command, a start logical address corresponding to the write command and first data corresponding to the write command, wherein the memory management circuit is further configured to determine whether the first data is a successive big data, if the first data is the successive big data, the memory management circuit temporarily stores the first data into the first data buffer area and writes the first data from the first data buffer area into the rewritable non-volatile memory module, if the first data is not the successive big data, the memory management circuit temporarily stores the first data into the second data buffer area without storing the first data into the first data buffer area.

9. The memory control circuit unit according to claim 8, wherein in the operation of determining whether the first data is the successive big data, the memory management circuit determines whether the start logical address is a multiple of a data access unit and whether a size of the first data is a multiple of the data access unit, if the start logical address is the multiple of the data access unit and the size of the first data is the multiple of the data access unit, the memory management circuit identifies that the first data is the successive big data, if the start logical address is not the multiple of the data access unit or the size of the first data is not the multiple of the data access unit, the memory management circuit identifies that the first data is not the successive big data.

10. The memory control circuit unit according to claim 8, wherein if the first data is not the successive big data, the memory management circuit is further configured to read second data from a first physical programming unit of the rewritable non-volatile memory module to the second data buffer area and write the first data and the second data from the second data buffer area into a second physical programming unit of the rewritable non-volatile memory module.

11. The memory control circuit unit according to claim 8, wherein the memory management circuit is further configured to determine whether a program fail is occurred after writing the first data into the rewritable non-volatile memory module, if the program fail is occurred, the memory management circuit reads the first data from the second buffer memory and rewrites the first data into the rewritable non-volatile memory module according to the write command.

12. The memory control circuit unit according to claim 8, wherein the memory management circuit is further configured to receive a read command from the host system, wherein the memory management circuit is further configured to determine whether the second buffer memory stores third data belonging to a logical address indicated by the read command, wherein if the second buffer memory stores the third data belonging to the logical address indicated by the read command, the memory management circuit reads the third data from the second buffer memory and transmits the third data to the host system in response to the read command.

13. The memory control circuit unit according to claim 8, wherein the first buffer memory is a static random access memory, the second buffer memory is a synchronous dynamic random access memory, and a capacity of the second buffer memory is larger than a capacity of the first buffer memory.

14. A data writing method for a memory storage apparatus, wherein the memory storage apparatus includes a first buffer memory, a second buffer memory and a rewritable non-volatile memory module, a transmission bandwidth of the first buffer memory is larger than a transmission bandwidth of the second buffer memory, the data writing method comprising:
    receiving a write command, a start logical address corresponding to the write command and first data corresponding to the write command;
    determining whether the first data is a successive big data;
    if the first data is the successive big data, temporarily storing the first data into a first data buffer area of the first buffer memory and writing the first data from the first data buffer area into the rewritable non-volatile memory module; and
    if the first data is not the successive big data, temporarily storing the first data into a second data buffer area of the second buffer memory without storing the first data into the first data buffer area.

15. The data writing method according to claim 14, wherein the step of determining whether the first data is the successive big data comprises:
    determining whether the start logical address is a multiple of a data access unit and a size of the first data is a multiple of the data access unit;
    if the start logical address is the multiple of the data access unit and the size of the first data is the multiple of the data access unit, identifying that the first data is the successive big data; and
    if the start logical address is not the multiple of the data access unit or the size of the first data is not the multiple of the data access unit, identifying that the first data is not the successive big data.

16. The data writing method according to claim 14 further comprising:
    if the first data is not the successive big data, reading second data from a first physical programming unit of the rewritable non-volatile memory module to the second data buffer area and writing the first data and the second data from the second data buffer area into a second physical programming unit of the rewritable non-volatile memory module.

17. The data writing method according to claim 14 further comprising:
    determining whether a program fail is occurred after writing the first data into the rewritable non-volatile memory module; and
    if the program fail is occurred, reading the first data from the second buffer memory and rewriting the first data into the rewritable non-volatile memory module according to the write command.

18. The data writing method according to claim 14 further comprising:
    receiving a read command from the host system;
    determining whether the second buffer memory stores third data belonging to a logical address indicated by the read command; and
    if the second buffer memory stores the third data belonging to the logical address indicated by the read command, reading the third data from the second buffer memory and transmitting the third data to the host system in response to the read command.

* * * * *